United States Patent
Arnold et al.

(10) Patent No.: US 6,279,128 B1
(45) Date of Patent: Aug. 21, 2001

(54) AUTONOMOUS SYSTEM FOR RECOGNITION OF PATTERNS FORMED BY STORED DATA DURING COMPUTER MEMORY SCRUBBING

(75) Inventors: William Carlisle Arnold, Mahopac, NY (US); Jehoshua Bruck, La Canada, CA (US); Jeffrey Owen Kephart, Yorktown Heights, NY (US); Gregory Bret Sorkin; Steve Richard White, both of New York, NY (US); David Michael Chess, Mohegan Lake, NY (US); Charles Edwin Cox; Myron Dale Flickner, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/366,281

(22) Filed: Dec. 29, 1994

(51) Int. Cl.[7] ............................ H02H 3/05; H04B 1/74
(52) U.S. Cl. ............................ 714/49; 714/54; 714/720
(58) Field of Search ......................... 395/183.14, 185.07, 395/185.05, 183.13, 185.02; 380/3, 4; 371/55, 57.1, 21.2, 21.3, 21.6; 714/38, 54, 52, 37, 49, 718, 720, 723

(56) References Cited

U.S. PATENT DOCUMENTS

| | | | |
|---|---|---|---|
| 4,371,949 | * 2/1983 | Chu et al. | 371/21.6 |
| 4,479,214 | * 10/1984 | Ryan | 371/21.6 |
| 4,621,364 | * 11/1986 | Tschoepe | 371/21.6 |
| 4,926,425 | 5/1990 | Hedtke et al. | 371/22.6 |
| 4,964,130 | * 10/1990 | Bowden, III et al. | 371/21.2 |
| 4,975,950 | 12/1990 | Lentz | 380/4 |
| 5,031,180 | 7/1991 | McIver et al. | 371/36 |
| 5,101,409 | 3/1992 | Hack | 371/21.3 |
| 5,121,345 | 6/1992 | Lentz | 364/550 |
| 5,138,619 | 8/1992 | Fasang et al. | 371/21.1 |
| 5,144,659 | * 9/1992 | Jones | 380/4 |
| 5,144,660 | 9/1992 | Rose | 380/4 |
| 5,155,844 | * 10/1992 | Chang et al. | 371/21.6 |
| 5,263,032 | 11/1993 | Porter et al. | 371/40.2 |
| 5,274,646 | * 12/1993 | Brey et al. | 371/40.1 |
| 5,319,776 | * 6/1994 | Hile et al. | 395/575 |
| 5,398,196 | * 3/1995 | Chambers | 395/500 |
| 5,440,723 | * 8/1995 | Arnold et al. | 395/183.14 |
| 5,442,699 | * 8/1995 | Arnold et al. | 380/4 |
| 5,446,741 | * 8/1995 | Boldt et al. | 371/21.1 |
| 5,452,442 | * 9/1995 | Kephart | 395/183.14 |

(List continued on next page.)

OTHER PUBLICATIONS

Phillippo, "Practical Virus Detection and Prevention", IEE Colloq. No. 132, pp. 2/1–2/2, 1990.*

(List continued on next page.)

Primary Examiner—Dieu-Minh Le
(74) Attorney, Agent, or Firm—Baker, Maxham, Jester & Meador; Marc D. McSwain

(57) ABSTRACT

A system for continuous monitoring and autonomous detection of patterns in the main memory subsystem of a computer system. The invention can be embodied as an extension to existing memory scrubbing hardware to permit stored code pattern analysis and identification during the autonomous transparent memory scrubbing process. A library of stored target signatures is provided to which code signatures are compared during analysis. Code signatures may be derived directly from the memory subsystem data pattern or may be indirectly and more efficiently derived from the error correction code (ECC) string associated with the stored data pattern. This invention is directly applicable to computer virus detection and neutralization systems.

22 Claims, 4 Drawing Sheets

U.S. PATENT DOCUMENTS

| | | | |
|---|---|---|---|
| 5,475,839 | * | 12/1995 | Watson et al. .................... 395/650 |
| 5,485,575 | * | 1/1996 | Chess et al. ................... 395/183.14 |
| 5,493,649 | * | 2/1996 | Slivka et al. ................... 395/183.14 |
| 5,495,491 | * | 2/1996 | Snowden et al. ................. 371/40.1 |
| 5,511,163 | * | 4/1996 | Lerche et al. .................. 395/183.04 |

OTHER PUBLICATIONS

Qasem et al. "Computer Viruses: Detectiona ND Prevention Techniques", Southeastcon, IEEE Conf. Proceedings, pp. 199–201, 1990.*

P. Roche, "Logic Signature Application", IBM Technical Disclosure Bulletin, vol. 27, No.8, Jan. 1985, pp. 4943–4944.

D. H. Steves et al., "Trojan Horse and Virus Detection Using Real–Time Auditing", IBM Technical Disclosure Bulletin, vol. 34, No. 7B, Dec. 1991, pp. 78–81.

T. R. N. Rao et al, "Error–Control Coding for Computer Systems", 1989, Prentice–Hall, Inc.

V. I. Levenshtein, "Binary Codes Capable of Correcting Deletions, Insertions, and Reversals", Soviet Physics-Doklady, vol. 10, No. 8, Feb., 1966.

* cited by examiner

AUTONOMOUS SYSTEM FOR RECOGNITION OF PATTERNS FORMED BY STORED DATA DURING COMPUTER MEMORY SCRUBBING

BACKGROUND OF THE INVENTION

1. Field of the Invention

This invention relates generally to computer memory error correction systems and specifically to a signature detection system for locating clandestine or sinister code patterns during normal memory "scrubbing" operations.

2. Discussion of the Related Art

Semiconductor memory devices used to implement main memory elements of modern computer systems are manufactured with cell sizes and densities such that individual storage cells are susceptible to alpha particle failure. This is particularly true for dynamic RAMs (DRAMs). Materials used in packaging such memory devices inevitably include radioactive traces that decay to create alpha particles that penetrate the silicon die. An alpha particle hit can cause a bit storage cell to switch states, creating a "soft" bit error, as is well-known in the art. To eliminate the effects of such soft errors, error checking and correcting circuitry is used in modern computer memory systems. An error correction circuit operates to add an Error Correction Code (ECC) to each incoming data item as it is stored. Because the ECC is calculated as a known function of the bit sequence making up the data item being stored, it can be recalculated and checked against the earlier stored ECC when the same data item is later read. With simple ECCs, a single soft bit error can be corrected transparently to the user (before submitting the data item to the CPU), permitting tolerance of the usual transient alpha particle hits in DRAM systems.

Even though soft errors can be tolerated in memory, to avoid long-term accumulation of such errors, it is a known practice to "scrub" (restore) memory locations that show correctable errors such as those produced by alpha particle hits in DRAMs. Memory scrubbing employs an extension to a storage subsystem with ECC circuits that performs continual autonomous reverification of memory storage accuracy. As used herein, "scrubbing" denominates the continual independent reading, ECC error checking and correcting, and rewriting of stored data to eliminate "soft" errors. When the memory subsystem is not busy with requests for data, the extended hardware reads a unit of storage in sequence, verifies its contents, and, if it contains a correctable error, corrects the data and restores the corrected data into memory. Since the ECCs are generally designed to operate on one word ("item") of data, a memory scrubbing subsystem typically must sequentially process every word in storage. Usually the memory subsystem includes the scrubbing hardware necessary to accomplish the scrubbing operations independently and transparently to the CPU. Alternatively, a scrubbing process can be implemented by the CPU as part of its operating system but such "software scrubbing" schemes consume substantial CPU resources that are otherwise not required in a "hardware scrubbing" subsystem.

Practitioners in the art have proposed various memory scrubbing schemes. For instance, in U.S. Pat. No. 5,263,032, Porter et al. disclose a memory scrubbing subsystem that provides for creation and storage of a memory "footprint" to permit identification of frequently-failing memory locations and to distinguish "hard" (uncorrectable) memory faults from "soft" errors at each memory address. When a second corrected read data error occurs for the same location for which an earlier corrected read data error was scrubbed, the location is assumed to have a "hard" fault and the page containg such location is replaced to permit continued, transparent error-free memory operation in the event of a new "soft" fault. Similarly, in U.S. Pat. No. 4,964,130, Bowden III et al. disclose a memory scrubber with an error flag system to distinguish hard faults from soft errors. Neither Porter et al. nor Bowden III et al. consider or suggest using a memory scrubbing subsystem to monitor the memory subsystem for data storage patterns not associated with hard faults. Both teach the use of dedicated hardware scrubbing subsystems operating autonomously from the CPU.

Other practitioners have considered useful solutions to the general memory testing problem arising from the unacceptable amount of time required to exhaustively verify the absence of "hard" storage errors for every bit in the hundreds of millions of storage locations in modern memory chips. These schemes usually employ bit pattern or "signature" comparisons to verify internal functions. For instance, in U.S. Pat. No. 5,138,619, Fasang et al. disclose a built-in self-test for integrated circuit memory that includes on-chip hardware means for checking digital signature outputs responsive to predetermined digital input patterns. Fasang et al. consider the "pass/fail" chip testing problem and neither consider nor suggest the application of their invention to autonomous memory subsystem scrubbing. Similarly, in U.S. Pat. No. 5,101,409, Hack teaches a checkerboard memory self-tester that employs multiple input signature registers and a random digital input pattern generator to implement a chip "pass/fail" test. Hack teaches a high-efficiency memory chip pass/fail tester and neither considers nor suggests the application of his random testing procedure to the autonomous scrubbing of memory subsystems.

In U.S. Pat. No. 4,926,425, Hedtke et al. disclose a system for testing digital circuits, which could include data storage circuits. Hedtke et al. disclose an automatic self-test system relying on special test-node circuits inserted between successive digital components for monitoring by an external testing computer. Hedtke et al. suggest the use of signature analysis techniques in their test node components but neither consider nor suggest the application of signature analysis to autonomous scrubbing of online memory subsystems.

Modern computer systems are subject to the unwelcome effects of "Trojan Horse" or "virus" programs infecting their operating systems. As is well-known in the art, Trojan Horses are programs that directly violate the system data integrity or nondisclosure policies in a computer operating system. When executed, these programs use the access rights and privileges of their invoker to access data beyond the scope of the program's stated function. Such integrity violations can be purposeful (altering a user database to grant a user more privilege) or simply malicious (destroying data at random). "Viruses" are programs that modify other programs when executed. These modified programs, in turn, infect still additional other programs, thereby propagating the virus indefinitely. Viruses usually propagate by appending a code to existing program files into which their invoker has write privileges. Virus propagation itself generally does little harm (except for the illicit consumption of system resources) but the real purpose of a virus may be to attach itself to a program that possesses "interesting" rights or privileges in the system, at which point the virus then becomes a Trojan Horse that can directly attack the security of the operating system. All such malicious programs are herein denominated "computer viruses".

Computer viruses are usually acquired by a computer user through the copying of "contaminated" software from outside sources and may lie dormant for some time before activation. A well-known class of schemes for the detection of computer viruses relies on the "virus scanner", which uses short byte strings (herein denominated "signatures") to identify particular computer viruses in executable files, boot records or memory. The "target" signatures selected to identify a particular computer virus should be chosen such that they always discover the virus if it is present but seldom give rise to a false alarm. The commonly-assigned copending patent application Ser. No. 004,871, entitled "A Method for Evaluating and Extracting Computer Virus Signatures", (assignee docket no. YO992-002) filed Jan. 19, 1993 on and entirely included herein by this reference, discloses a statistical method for automatically extracting computer virus signatures suitable for efficient virus detection with minimal false-alarm rates.

Another class of virus detection schemes known in the art relies on the detection of activity initiated by the computer virus. For instance, in U.S. Pat. No. 5,144,660, Rose discloses a method for protecting a computer against "virus" programs that employs a hardware device inserted between the disk controller card and the disk drive of a computer system to monitor the disk drive bus for illegitimate write attempts to a protected area of the storage disk. Rose neither considers nor suggests virus detection techniques suitable for "passive" discovery of stored computer viruses. Similarly, Steves et al. (IBM Technical Disclosure Bulletin, Vol. 34, No. 7B, pp. 78–81, December 1991) propose a preemptive real-time auditing process to counteract illegitimate virus activities. This preemptive auditing process monitors operating programs to detect suspicious activities and relies on real-time preemptive operation to prevent undetected manipulation of the auditing subsystem itself. Steves et al. neither consider nor suggest any passive techniques for uncovering inactive computer viruses within a computer system. Finally, in U.S. Pat. Nos. 4,975,950 and 5,121,345, Lentz discloses a system for preventing the unauthorized alteration of stored data by a computer virus that employs a dedicated device or "second program" to check the system files for the presence of a computer virus before the system files are loaded into the memory subsystem from external storage. Thus, Lentz requires his "second program" to preempt the CPU before "boot-up" and to examine the operating system files in external storage for the presence of a computer virus. Once the externally-stored system files are given a clean bill-of-health by the "second program", the normal boot-up process continues in the usual manner. Lentz does not consider the problem of possible computer virus contamination of his "second program" nor does he consider the problem of memory contamination occurring during system operation following the review of system files before boot-up.

Accordingly, there is a clearly-felt need in the art for a "passive" technique suitable for uncovering inactive computer virus signatures in a memory subsystem. It is desirable that such a passive computer virus detecting system operate autonomously and transparently to the main CPU, preferably through the use of dedicated ("bullet-proof") hardware that can be isolated from unauthorized manipulation by computer viruses. These unresolved problems and deficiencies are clearly felt in the art and are solved by this invention in the manner described below.

SUMMARY OF THE INVENTION

This invention solves the above-described problems by a combining pattern-detection process with a memory-scrubbing process in a manner that allows autonomous detection of target patterns such as computer virus fragments stored in the memory subsystem of a computer system.

It is an object of the system of this invention to provide continuous autonomous scrutiny of the patterns formed by data stored in main memory. It is an advantage of the system of this invention that continuous off-line scrutiny of such data patterns is accomplished in concert with the memory-scrubbing data stream.

It is another object of the system of this invention to provide sophisticated data-pattern detection capability, including pattern detection based on statistical measures of similarity determined over a selectable range of stored data. It is another advantage of the system of this invention that, because the memory-scrubbing process operates to continuously and sequentially scans the entire memory subsystem, all stored data patterns are made continuously available for signature analysis. It is yet another advantage of the system of this invention that stored data patterns can be compared with each of a sizeable plurality of stored target data patterns to develop statistical measures of similarity to many different patterns of interest.

It is yet another object of the system of this invention to minimize false alarm rates associated with computer virus detection. It is another advantage of the system of this invention that the storage addresses of suspicious data patterns found to be innocent can be stored in a clean window log table and later consulted to avoid unnecessary re-examination of such innocent data patterns.

The foregoing, together with other objects, features and advantages of this invention, can be better appreciated with reference to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
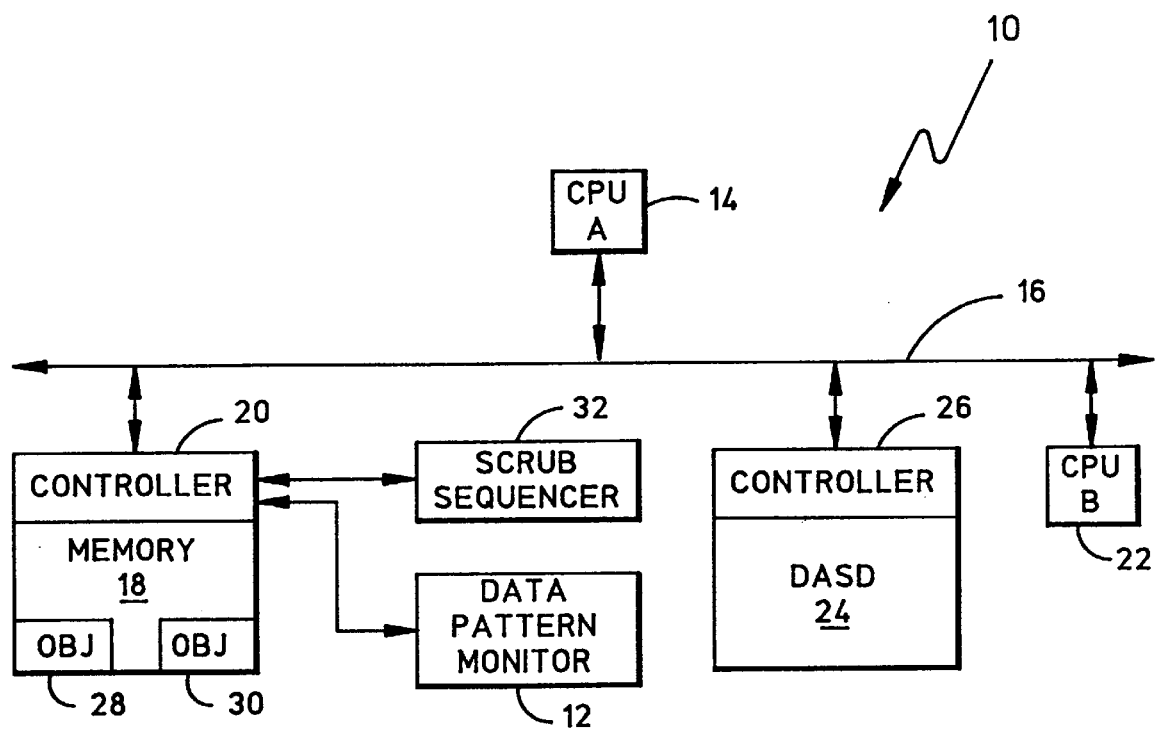
FIG. 1 is a functional block diagram of an exemplary embodiment of a computer system employing the data pattern monitor system of this invention.
Figure 5:
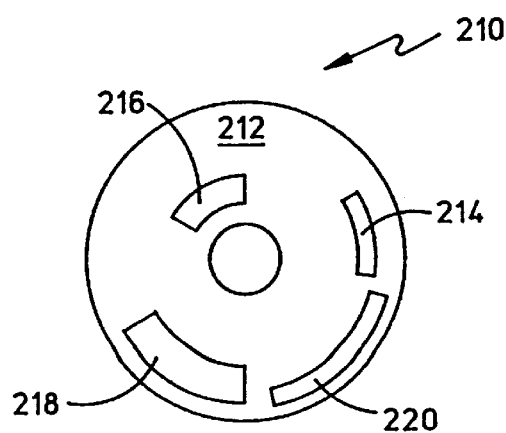
FIG. 5 is a functional diagram depicting a computer program product containing a plurality of program objects according to the method of this invention.

FIG. 1 shows a functional block diagram for an exemplary computer system 10 employing the data pattern monitor 12 of this invention. Computer system 10 includes a CPU 14 connected by a system bus 16 to other computer system components, including a main addressable memory 18 connected by way of the memory controller 20. Other elements coupled to bus 16 may include other CPUs exemplified by the CPU 22 and other data storage subsystems exemplified by the direct access storage device (DASD) 24 coupled by way of the DASD controller 26. Memory 18 contains many data and program objects, exemplified by data object 28 and program object 30. Data object 28 could represent a data storage table such as the clean window log table discussed below, for instance. Program object 30 could represent a sophisticated computer virus analysis and neutralization routine of the type well-known in the art for verifying and deactivating known computer viruses, for instance. Computer system 10 includes memory "scrubbing" capability and the scrub sequencer 32 element of memory controller 20 is depicted separately for illustrative purposes. Data pattern monitor 12 of this invention may also be considered an element of memory controller 20 and is depicted separately in FIG. 1 for illustrative purposes.

Figure 2:
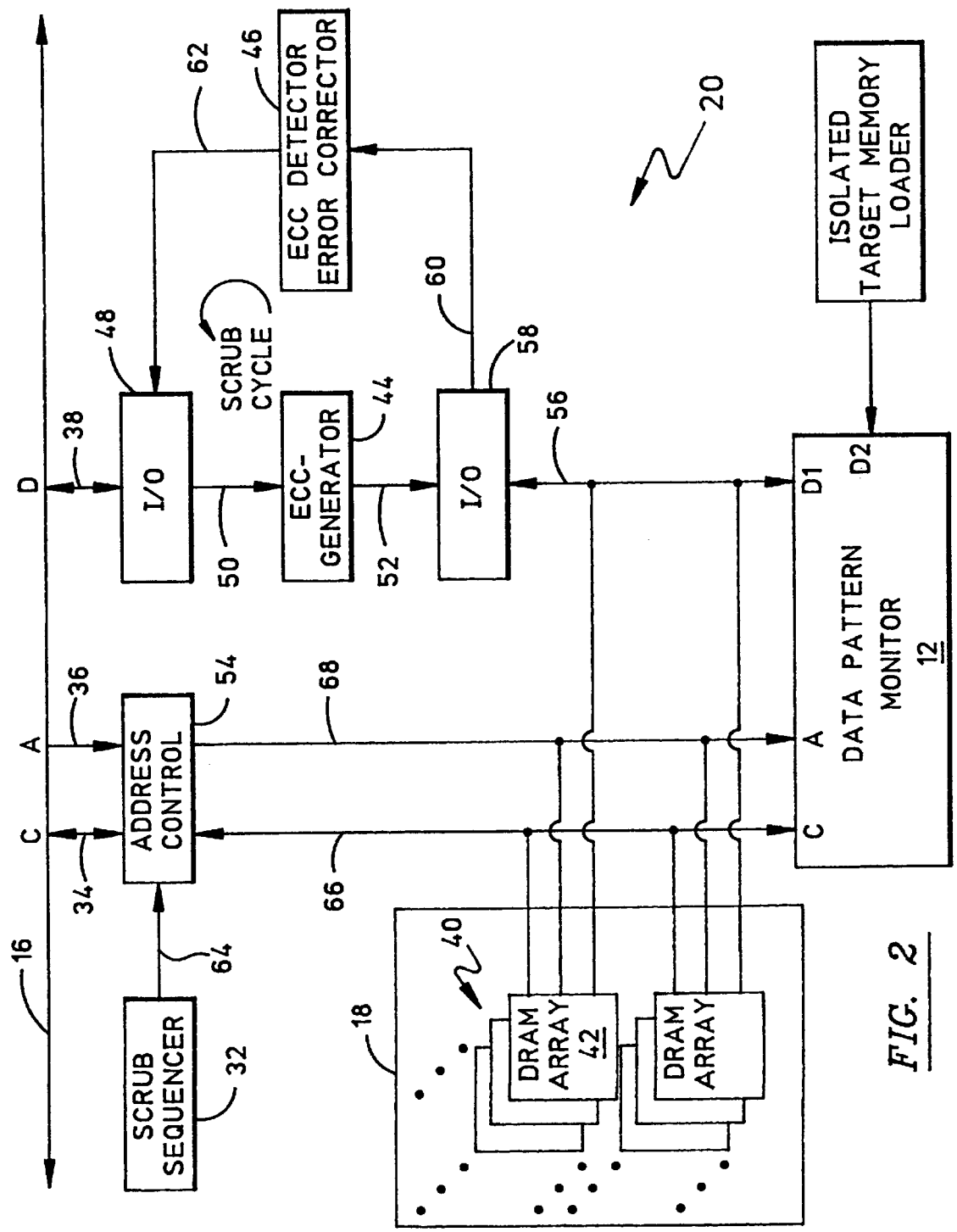
FIG. 2 is a functional block diagram showing details of the memory controller portion of the system from FIG. 1.

Referring to FIG. 2, memory 18 and memory controller 20 are described in more detail. Bus 16 is shown with three distinct elements: a control signal bus 34, an address bus 36 and a data bus 38. Memory 18 contains a multiplicity of banks of DRAM arrays, exemplified by bank 40, which includes a multiplicity of DRAM arrays exemplified by DRAM array 42. For example, a 64 Mbit physical memory 18 could contain 128 four Mbit DRAM devices arranged on printed circuit boards plus additional DRAM devices required to handle ECCs, parity and other ancillary bits associated with the stored data words. The particular configuration of computer system 10 and memory 18 is governed by specific system design considerations that are not material to the description of this invention.

Except for the relationship to and operation of data pattern monitor 12 of this invention, the operation of memory controller 20 and memory 18 is generally known and appreciated in the art. The data paths for writing to and from memory 18 include an ECC generator 44, and an ECC detector and error corrector 46. Incoming data on bus 38 is routed through the input/output (I/O) switch 48 to ECC generator 44, where an ECC bit sequence is generated for each data item. Thus, the input bus 50 to ECC generator 44 carries data alone and the output bus 52 from ECC generator 44 includes both data and their associated ECCs, which are stored together in memory 18. For example, if the width of data bus 38 is 64 bits, an ECC may be generated for each 64-bit word of data presented on bus 50. Thus, bus 52 must include the 64 bits of data together with perhaps 8 bits of ECC, for a total bus width of 72 bits. Similarly, the addressable storage word in DRAM array 42 must also be 72 bits, which are retrieved by operation of the address control circuit 54 responsive to the appropriate signals on control signal bus 34 and address bus 36.

In a read operation, the addressed data word (e.g., a 64-bit sequence) is retrieved from memory 18 together with its associated ECC (e.g., an 8-bit sequence) by way of the internal bus 56 to the input/output (I/O) switch 58, which routes it over the bus 60 to ECC detector 46. ECC detector and error corrector 46 first recalculates the ECC for the data sequence to obtain a second ECC and then compares this second ECC with the first ECC stored earlier to determine if the retrieved data is precisely unchanged from when it was written. If the retrieved data is without error, it is passed over the internal bus 62 to I/O switch 48, which routes it to data bus 38 (part of system bus 16). If ECC detector 46 uncovers an error in the retrieved data, this error is corrected (assuming that the error is within the correction range of the particular ECC process embodied therein) and the corrected data is passed along to bus 16 in the same fashion. At this point, the correctable data error still exists in memory 18. This error can be corrected in many different ways. ECC detector 46 can initiate a "scrub cycle" for the particular address by signalling address control circuit 54 (not shown) and cause I/O device 48 to switch the corrected data on bus 62 around to bus 50 and down into memory 18 for restorage. This process is herein denominated a memory scrub cycle. ECC detector 46 may also cause an interrupt to be generated by address control circuit 54 for transmission via bus 34 over bus 16 to CPU 14. This CPU interrupt may initiate a software memory scrubbing cycle under CPU control.

For the purposes of describing this invention, the stored soft bit error is presumed to be corrected by a hardware scrub cycle. Further, it is assumed that scrub sequencer 32 operates to continuously sequence through memory 18 from one end of the physical address space to the other. That is, the scrub cycle is implemented for every physical memory address location in memory 18 on a continuing basis without waiting for a CPU request for data before detecting and fixing soft bit errors. Scrub sequencer 32 controls the continuous verification of the contents of memory 18 by way of address control circuit 54. Whenever address control circuit 54 is not busy with traffic on bus 34, it accepts control and address instructions from scrub sequencer 32 on internal bus 64. These scrub sequencer instructions are interpreted to provide the necessary control words on internal bus 66 and addresses on internal bus 68. Thus, as can be appreciated from the above description of read and write operations, each word stored in memory 18 is (a) specified on internal address bus 68, (b) read responsive to a read command on internal bus 66, (c) analyzed and corrected by ECC detector 46 and (d) cycled around and rewritten into the same address responsive to a write command on internal bus 66. This scrub cycle is repeated continuously for each sequential address in memory 18, subject only to pauses for servicing incoming traffic from CPU 14.

Data pattern monitor 12 thus has access to the continual stream of control words on internal bus 66, the continuous stream of physical addresses on internal bus 68 and the stream of data words on bus 56. This continuous information flow is a useful consequence of the autonomous memory scrubbing process just described that, until now, has never been exploited in the art for data pattern monitoring.

Figure 3:
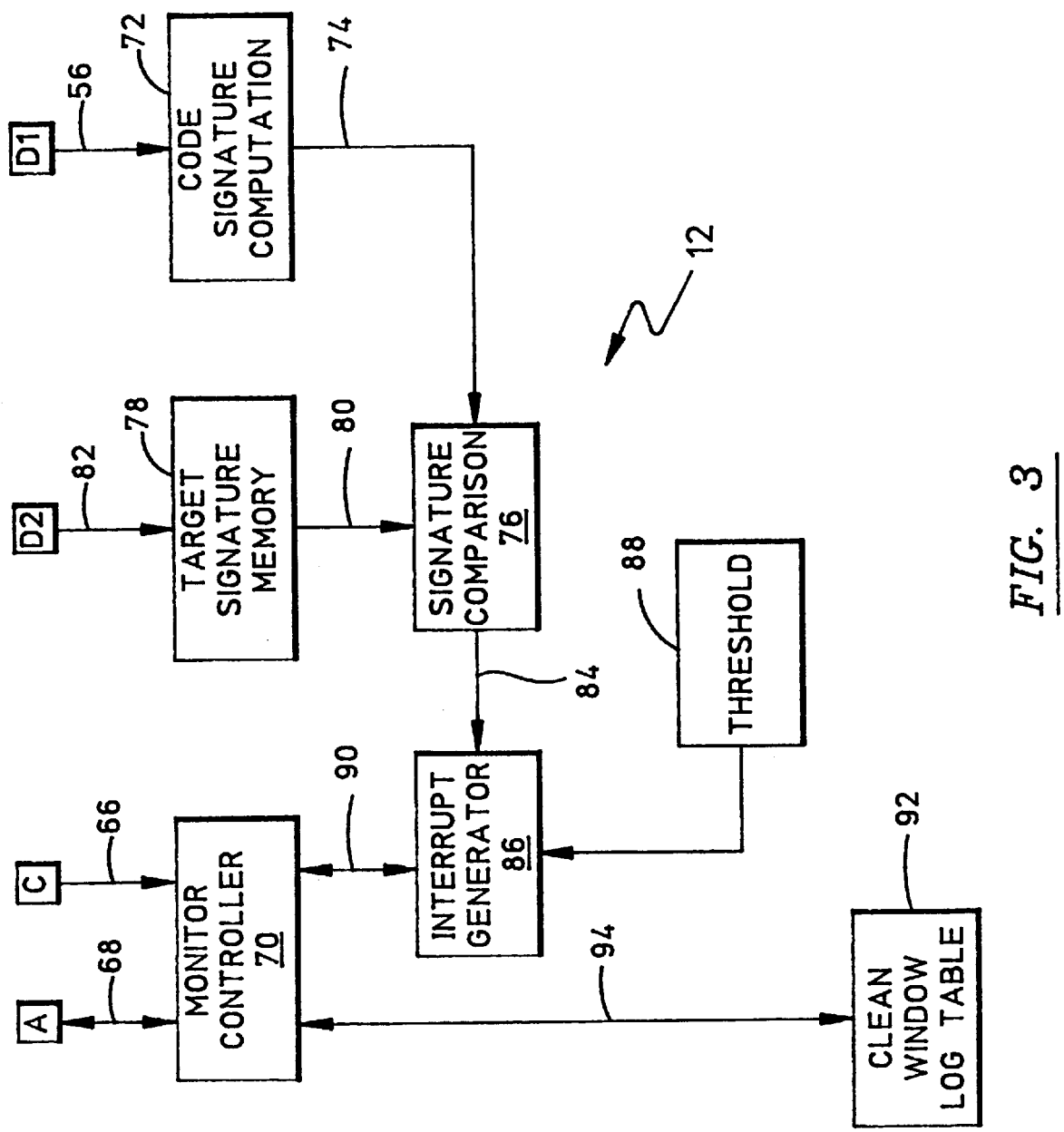
FIG. 3 is a detailed functional block diagram of an exemplary embodiment of the autonomous data pattern monitor system of this invention from FIGS. 1 and 2.

FIG. 3 shows data pattern monitor 12 in more detail. Data pattern monitor 12 operates to detect patterns created by the data bits stored in memory 18 and is preferably embodied in hardware to avoid burdening CPU 14 with such continuous activity. In FIG. 3, the address on internal bus 68 and control words on internal bus 66 are passed to the monitor controller 70. Simultaneously, the data on internal data bus 56 is passed to a code signature computation circuit 72. Computation circuit 72 computes a code signature on the data accumulated over a selectable finite moving window (e.g., 32 sequential words). A programmable mask option can be included in computation unit 72 to selectively exclude particular data words from the moving window signature computation process. After each scrub cycle, the computed signature is transferred on internal bus 74 to the signature comparison circuit 76.

The target signatures used by signature comparison circuit 76 are stored in the target signature memory 78 and passed to signature comparison circuit 76 over the internal bus 80. The target signatures are preferably preloaded into target signature memory 78 and may be loaded by the operating system during the "boot-up" of the system or may be preserved in non-volatile storage. In FIG. 3, the target signatures are shown as loadable from a separate data bus 82 in some manner. The use of a separate bus 82 ensures that the contents of target signature memory 78 are isolated from possible contamination by illicit computer virus activity. Periodic updates and additions to the target signature library can be made by the user merely by reloading new signatures over bus 82.

The system of this invention is suited to search and detect in addressable memory many different types of data bit patterns. Although not limiting on this invention, one example of particular interest is the detection of computer virus patterns or fragments. The moving window signatures can be examined for an exact match with known virus fragment patterns or can be examined statistically to produce a "measure of similarity" representing how close the stored data pattern is to one or more known virus fragments. The above-cited copending patent application Ser. No. 004,871 provides an extensive description of methods for extracting bit sequences from known computer viruses that are useful for detecting the presence of such virus without unacceptable false alarm rates. A useful "measure of similarity" can be derived using known "distance matching" techniques such as those described by Hamming or Levenshtein ("Binary Codes Capable of Correcting Deletions, Insertions, and Reversals", Soviet Physics-Doklady, Vol. 10, No. 8, pp. 707–710, February 1966). Such techniques can determine that a stored data sequence is within a specified hamming distance or that the two patterns differ by a minimum number of insertions and deletions.

"Global" or regional signature matching is also a useful technique that can be implemented in signature comparison circuit 76. For instance, signature matches ("hits") within a predetermined distance threshold can be accumulated over a specified memory region to develop a "global measure of similarity" to several different virus fragments known to occur in a defined region.

Code signature computation circuit 72 recomputes a code signature at each scrub cycle, which is necessary because the computer virus fragment patterns sought can appear at any starting offset in memory address space. Thus, by recomputing the code signature at each scrub cycle, the finite moving window examined for the target pattern is effectively stepped word by word through the entire memory address space. The same advantageous effect can be achieved by computing the code signature over adjacent blocks of addresses and stepping the block starting address with each pass through memory 18. Alternatively, the target signature memory 78 can be preloaded with target signatures representing all possible alignments of known virus fragments in the finite window size employed.

Thus, for each scrub cycle, signature comparison circuit 76 compares one code signature from bus 74 with each of the multiplicity of target signatures presented on internal bus 80 from target signature memory 78. Signature comparison circuit 76 produces a "measure of similarity" for each of the multiplicity of target signatures in target signature memory 78 and presents this series of "measures of similarity" to the interrupt generator circuit 86 on internal bus 84. Interrupt generator circuit 86 compares each "measure of similarity" from bus 84 with a threshold 88. When interrupt generator 86 encounters a measure of similarity that exceeds threshold 88, it produces a CPU interrupt on internal bus 90, which is presented to monitor controller 70 for transfer to CPU 14 by way of internal bus 66 to address control 54 and control signal bus 34 (FIG. 2).

Responsive to the CPU interrupt created by interrupt generator 86, CPU 14 starts a secondary task that includes a high-level antivirus process designed to verify and disable the suspected computer virus found in memory 18. This secondary task performs any validation or correction steps necessary, which might include examination of the entire region around the code signature window in which the match was found, determination as to which virus or viruses are involved and verification of the presence of the suspected computer virus. If a computer virus is verified, it could be automatically deactivated by other elements of the secondary task, the system could be alerted to signal the user with a request for further instructions, or the entire computer system 10 could be halted until outside support can be summoned.

This secondary antivirus task should ideally be invoked only when necessary to minimize the unnecessary use of system resources. If the secondary task finds that the suspected data pattern is a "false alarm" and represents innocent data instead of a computer virus, then the address of the window that produced the code signature leading to the CPU interrupt is stored in the clean window log table 92 by monitor controller 70 by way of the internal bus 94. Monitor controller 70 also searches clean window log table 92 by way of internal bus 94 during each scrub cycle and produces an inhibit signal on internal bus 90 whenever the current scrub address on bus 68 matches an entry in clean window log table 92. This inhibit signal on bus 90 operates to inhibit interrupt generator 86 to prevent CPU interrupts from signature matches in windows that have already been checked for computer viruses by the secondary antivirus task monitor controller to remove from clean window log table 92 the window address after any write to a storage location within the window in a fashion similar to the "dirty" marking of a rewritten cache line.

Figure 4:
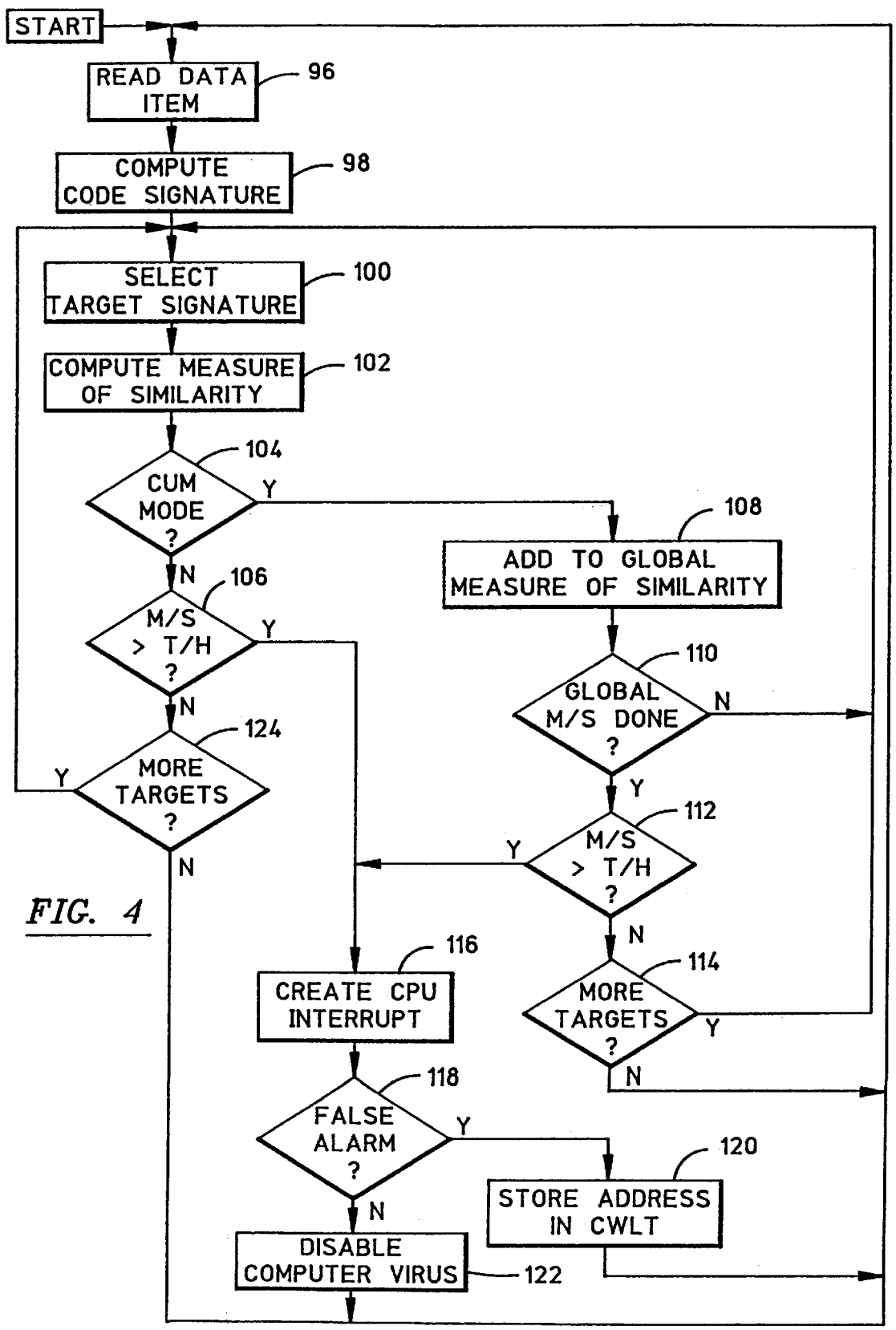
FIG. 4 is a functional flow diagram of showing an exemplary embodiment of the method of this invention.

FIG. 4 shows a flow diagram of an exemplary embodiment of the procedure of this invention. The process starts by reading a data item at step 96. The data item includes both the data bit sequence and the ECC bit sequence, either or both of which can be used in step 98 to compute the code signature. Using the ECCs to compute code signatures saves considerable hardware because the ECC sequence is typically only a fraction of the size of the data sequence and ECC code signature extraction requires significantly less hardware. Because the ECC uniquely represents the data bit sequence, useful code signatures can be derived from the ECC alone.

After computing the code signature at step 98, the comparison loop begins with selection of a stored target signature at step 100. After selecting a target signature, the measure of similarity between code and target signatures is computed at step 102. Step 104 asks if the pattern detection process is in a "cumulative" mode. That is, is a single measure of similarity test sufficient to generate a CPU interrupt or is the CPU interrupt generated responsive to a "global" examination of several windows. If not in cumulative mode, step 106 next compares the measure of similarity to an appropriate threshold to determine whether a CPU interrupt must be originated. If in cumulative mode, step 108 next adds the measure of similarity to some global accumulation of such measures of similarity and then proceeds to step 110 to test whether the global measure of similarity is completed. If not completed, the procedure returns to the beginning of the loop at step 100 for the next target signature. If complete, the procedure then tests the global measure of similarity against an appropriate threshold at step 112. If this test fails, then step 114 checks for more target signatures and returns to the beginning of the loop at step 100 if more signatures await comparison. If the target signatures are exhausted, step 114 returns to the beginning at step 96 to read the next data item.

If either measure of similarity test at steps 106 or 112 succeeds, then step 116 creates the CPU interrupt signalling successful pattern detection. Immediately after creating the interrupt, the secondary antivirus task is activated to verify the existence of a virus (not shown) and may return a false alarm indication. If the secondary task returns a false alarm indication at step 118, the window address is stored in the clean window log table at step 120 and the process returns to step 96 to read the next data item. If there is no false alarm, then the secondary task disables the computer virus at step 122 and the process then returns to step 96. If the threshold test at step 106 fails, step 124 tests for target signature exhaustion and either returns to step 100 for the next target signature or to step 96 for the next data item.

Although this invention is described as a method and a system, it is readily apparent to a person of ordinary skill in the art that the system of this invention may be embodied as a conventional data processor, including a CPU, memory, program storage, a connecting bus and the like. Such a processor may include appropriate program means for executing the method of this invention. Also, an article of manufacture such as the pre-recorded floppy disk 210 or other similar computer program product, for use with a data processing system, may include a storage medium and program means recorded thereon for directing a data processing system to facilitate the practice of the method of this invention. For instance, disk 210 includes a recording surface 212 on which a reading program object 214, a mapping program object 216, a comparing program object 218 and an interrupt program object 220 are recorded. It is readily apparent to practitioners in the art that program product articles of manufacture such as disk 210 also fall within the spirit and scope of this invention.

Clearly, other embodiments and modifications of this invention may occur to those of ordinary skill in the art in view of these teachings. Therefore, this invention is to be limited only by the following claims, which include all such embodiments and modifications when viewed in conjunction with the above specification and accompanying drawing.

We claim:

1. A method for operating a computer system having a central processing unit (CPU) for processing data responsive to interrupt signals and stored instructions, having a memory for storing data in a plurality of addressable locations and having scrubbing means for the continuous autonomous detection and correction of soft bit errors in said data stored in said memory, said method comprising the steps of:
   (a) providing one or more items of said data read by said scrubbing means from a first memory address;
   (b) mapping said one or more data items to produce a code signature related to said one or more data items according to a first predetermined transformation;
   (c) comparing said code signature to each of one or more stored target signatures to determine a measure of similarity therebetween;
   (d) producing a CPU interrupt signal when said measure of similarity equals or exceeds a predetermined threshold; and
   (e) repeating steps (a) through (d) for each of said plurality of memory locations.

2. The method of claim 1 wherein said data includes associated error correction codes (ECCs) and said mapping step (b) comprises the step of:
   (b) mapping said associated ECCs to produce said code signature related to said one or more data items according to a second predetermined transformation.

3. The method of claim 2 wherein said comparing step (c) comprises the step of:
   (c.1) comparing each of a plurality of said code signatures to said each stored target signature to determine said measure of similarity.

4. The method of claim 3 wherein said computer system includes means for storing a clean window log table of said memory addresses that are free of computer virus fragments and further comprising the steps of:
   (f) testing, responsive to said CPU interrupt signal, said one or more data items from said first memory address for the presence of a computer virus fragment; and
   (g) storing said first memory address in said clean window log table if no said computer virus fragment is found; otherwise
   (h) disabling any said computer virus fragment found at said first memory address; and
   (i) deleting said first memory address from said clean window log table responsive to any change to said one or more data items stored at said first memory address in said memory.

5. The method of claim 4 wherein said producing step (d) consists essentially of the step of:
   (d) producing said CPU interrupt signal when said measure of similarity equals or exceeds a predetermined threshold for any said first memory address not stored in said clean window log table.

6. The method of claim 1 wherein said computer system includes means for storing a clean window log table of said memory addresses that are free of computer virus fragments and further comprising the steps of:
   (f) testing, responsive to said CPU interrupt signal, said one or more data items from said first memory address for the presence of a computer virus fragment; and
   (g) storing said first memory address in said clean window log table if no said computer virus fragment is found; otherwise
   (h) disabling any said computer virus fragment found at said first memory address; and
   (i) deleting said first memory address from said clean window log table responsive to any change to said one or more data items stored at said first memory address in said memory.

7. The method of claim 6 wherein said producing step (d) consists essentially of the step of:
   (d) producing said CPU interrupt signal when said measure of similarity equals or exceeds a predetermined threshold for any said first memory address not stored in said clean window log table.

8. The method of claim 1 wherein said comparing step (c) comprises the step of:
   (c.1) comparing each of a plurality of said code signatures to said each stored target signature to determine said measure of similarity.

9. A computer system comprising:
   memory means for storing data in a plurality of addressable locations;
   CPU means coupled to said memory means for processing data responsive to interrupt signals and stored instructions;
   scrubbing means coupled to said memory means for the continuous autonomous detection and correction of soft bit errors in said data stored in said memory means including means for reading one or more data items from said memory means and means for writing said data items with corrections to said memory means;
   signature computation means coupled to said scrubbing means for mapping one or more said data items from a first said memory address to produce a code signature related to said one or more data items according to a first predetermined transformation;

signature storage means coupled to said signature computation means for storing one or more target signatures; and signature comparison means coupled to said signature computation means for comparing said code signature to each of said plurality of target signatures to determine a measure of similarity therebetween including means for producing a CPU interrupt signal when said measure of similarity equals or exceeds a predetermined threshold.

10. The system of claim 9 wherein said data includes associated error correction codes (ECCs), said system further comprising:

ECC means coupled to said memory means for producing a first ECC for storage with each said data item and for producing a second ECC upon retrieving said each data item including means for comparing said second ECC with said first ECC to detect and correct bit errors in said each retrieved data item; and ECC signature means in said signature computation means for mapping said first ECC associated with said one or more data items from said first memory address to produce said code signature related to said one or more data items according to a second predetermined transformation.

11. The system of claim 10 wherein said signature comparison means comprises:

cumulative signature means for comparing each of a plurality of said code signatures to said each target signature to determine said measure of similarity.

12. The system of claim 11 further comprising:

virus detection means coupled to said CPU means for testing, responsive to said CPU interrupt signal, said one or more data items from said first memory address for the presence of a computer virus fragment;

logging means coupled to said signature comparison means for storing said first memory address in a clean window log table of said memory addresses that are free of computer virus fragments if no computer virus fragment is found at said first memory address including means for deleting from said clean window log table each said memory address at which said one or more data items is changed; and antivirus means coupled to said CPU means for disabling any said computer virus fragment found at said first memory address.

13. The system of claim 12 wherein said signature comparison means comprises:

bypass means for preventing said CPU interrupt signal production for any said first memory address stored in said clean window log table.

14. The system of claim 9 further comprising:

virus detection means coupled to said CPU means for testing, responsive to said CPU interrupt signal, said one or more data items from said first memory address for the presence of a computer virus fragment;

logging means coupled to said signature comparison means and said CPU means for storing said first memory address in a clean window log table of said memory addresses that are free of computer virus fragments if no computer virus fragment is found at said first memory address including means for deleting from said clean window log table each said memory address at which said one or more data items is updated; and antivirus means coupled to said CPU means for disabling any said computer virus fragment found at said first memory address.

15. The system of claim 14 wherein said signature comparison means comprises:

bypass means for preventing said CPU interrupt signal production for any said first memory address stored in said clean window log table.

16. The system of claim 9 wherein said signature comparison means comprises:

cumulative signature means for comparing each of a plurality of said code signatures to said each stored target signature to determine said measure of similarity.

17. An addressable data memory system comprising:

memory means for storing data in a plurality of addressable locations;

scrubbing means coupled to said memory means for the continuous autonomous detection and correction of soft bit errors in said data stored in said memory means including means for reading one or more data items from said memory means and means for writing such data items with corrections to said memory means;

signature computation means coupled to said scrubbing means for mapping one or more said data items from a first said memory address to produce a code signature related to said one or more data items according to a first predetermined transformation;

signature storage means coupled to said signature computation means for storing one or more target signatures; and signature comparison means coupled to said signature computation means for comparing said code signature to each of said plurality of target signatures to determine a measure of similarity therebetween including means for producing a CPU interrupt signal when said measure of similarity equals or exceeds a predetermined threshold.

18. The system of claim 17 wherein said data includes associated error correction codes (ECCs), said system further comprising:

ECC means coupled to said memory means for producing a first ECC for storage with each said data item and for producing a second ECC upon retrieving said each data item including means for comparing said second ECC with said first ECC to detect and correct bit errors in said each retrieved data item; and ECC signature means in said signature computation means for mapping said first ECC associated with said one or more data items from said first memory address to produce said code signature related to said one or more data items according to a second predetermined transformation.

19. The system of claim 18 further comprising:

virus detection means coupled to said CPU means for testing, responsive to said CPU interrupt signal, said one or more data items from said first memory address for the presence of a computer virus fragment;

logging means coupled to said signature comparison means for storing said first memory address in a clean window log table of said memory addresses that are free of computer virus fragments if no computer virus fragment is found at said first memory address including means for deleting from said clean window log table each said memory address at which said one or more data items is changed; and antivirus means coupled to said CPU means for disabling any said computer virus fragment found at said first memory address.

20. The system of claim 19 wherein said signature comparison means comprises:

bypass means for preventing said CPU interrupt signal production for any said first memory address stored in said clean window log table.

21. A computer program product for use with a computer system having a central processing unit (CPU) for processing data responsive to interrupt signals and stored instructions, having a memory for storing data and associated error correction codes (ECCs) in a plurality of addressable locations and having scrubbing means for the continuous autonomous detection and correction of soft bit errors in said data stored in said memory, said computer program product comprising:

a recording medium;

means, recorded on said recording medium, for receiving one or more items of said data and said associated ECCs read by said scrubbing means from a first memory address;

means, recorded on said recording medium, for directing said computer system to map said one or more data items to produce a code signature related to said one or more data items according to a first determined transformation;

means, recorded on said recording medium, for directing said computer system to compare said code signature to each of one or more stored target signatures to determine a measure of similarity therebetween;

means, recorded on said recording medium, for directing said computer system to produce a CPU interrupt signal when said measure of similarity equals or exceeds a predetermined threshold; and means, recorded on said recording medium, for directing said computer system to repeat operation of said means for directing to read, said means for directing to map, said means for directing to compare, and said means for directing to produce for each of said plurality of memory locations.

22. The computer program product of claim 21 wherein said means for directing to map comprises:

means, recorded on said recording medium, for directing said computer system to map said associated ECCs to produce said code signature related to said one or more data items according to a second predetermined transformation.

* * * * *